A. NAINKA.
NUT LOCK.
APPLICATION FILED JULY 19, 1920.

1,367,985.

Patented Feb. 8, 1921.

Inventor
A. Nainka.
By C. A. Snow & Co.
Attorneys

UNITED STATES PATENT OFFICE.

ANTHONY NAINKA, OF JANESVILLE, WISCONSIN.

NUT-LOCK.

1,367,985.    Specification of Letters Patent.    Patented Feb. 8, 1921.

Application filed July 19, 1920. Serial No. 397,182.

*To all whom it may concern:*

Be it known that I, ANTHONY NAINKA, a citizen of the United States, residing at Janesville, in the county of Rock and State of Wisconsin, have invented a new and useful Nut-Lock, of which the following is a specification.

This invention relates to nut locks and is designed more especially as an improvement upon the structure disclosed in Patent No. 1,332,268 issued to me on March 2, 1920, and in my co-pending application filed March 8, 1920, Serial No. 364,020.

One of the objects of the invention is to provide a nut lock made up of relatively movable washers one of which is shiftable into engagement with the nut to be fastened and has novel means for holding it in such position, said holding means being in the form of a separate piece adapted to be applied to the two washers and to be held in place by them when in locking position.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
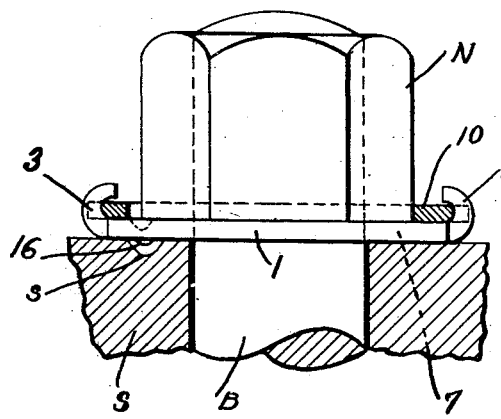
Figure 1 is an elevation of the nut lock in position, a portion being shown in section.
Figure 2:
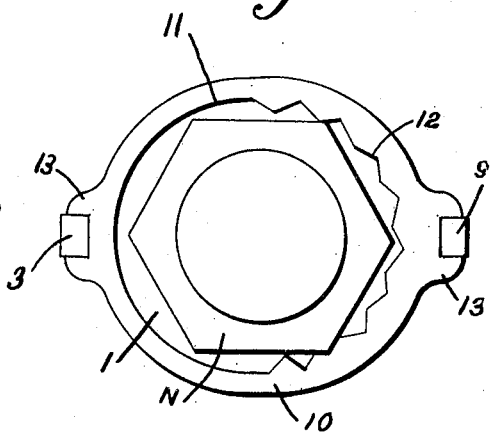
Fig. 2 is a plan view.
Figure 3:
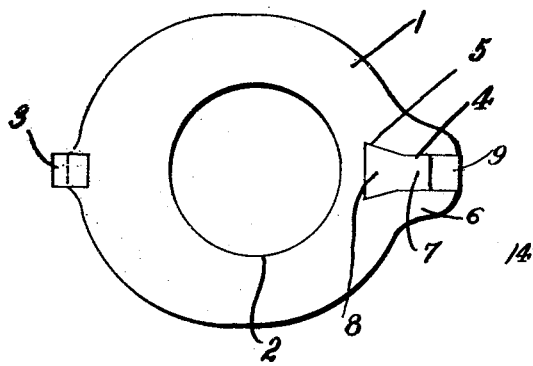
Fig. 3 is a plan view of the base washer showing the locking key in position.
Figure 4:
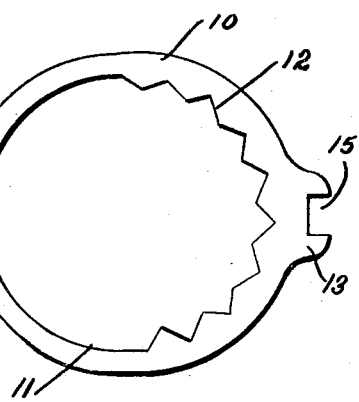
Fig. 4 is a plan view of the locking washer.

Referring to the figures by characters of reference 1 designates the base washer of the nut lock, this washer being provided with an eccentrically arranged bolt hole 2. Extending from the periphery of this washer is an upwardly and inwardly curved retaining tongue 3 and formed in the washer at a point diametrically opposite this ear or tongue is a slot 4 the inner end of which is enlarged or dove-tailed as indicated at 5. An ear or extension 6 is provided on this portion of the periphery of the washer and the slot 4 extends throughout the length of this ear.

A locking key is adapted to be fitted in the slot 4 and has been shown at 7. This key has an enlarged end portion 8 designed to fit snugly within the enlarged end 5 of the slot. The outer end of the key extends upwardly to form a bendable tongue 9 normally extended perpendicularly to the washer engaging portion of the locking key.

A locking washer 10 is adapted to rest upon the washer 1 and has a substantially elliptical opening 11 of sufficient size to receive the nut N to be locked. A portion of the wall of the opening 11 is formed with a plurality of notches or recesses 12. Ears 13 are extended from the periphery of the washer 10 at diametrically opposed points and are formed with recesses 14 and 15 respectively.

When it is desired to use the nut lock herein described a bolt B is inserted through the structure S which can be a fish plate or any other device to be fastened. The base washer 1 is then placed on the bolt so as to bear against the structure S. A notch s can be formed in the structure S and a node can be struck inwardly from the base washer as shown at 16 so as to project into the notch s. The key 7 is next inserted into the slot 4 and the nut N is screwed onto the bolt and against this key and the base washer. The locking washer 10 is next placed around the nut N and against the base washer 1 and as the opening in this washer 10 is elliptical said washer can, after being applied, be shifted longitudinally so as to bring the notch or recess 14 in position to receive the tongue 3. This same movement will position some of the corners of the nut within some of the recesses or notches 12 and will bring the recess 15 in position to receive the tongue 9. Said tongue is bent inwardly over the washer 19 as shown by full lines in Fig. 1 so that the parts are thus securely fastened together and it becomes impossible to unscrew the nut unless the tongue 9 is bent back so as to release the washer 10.

What is claimed is:

1. A nut lock including a base washer having a dove-tailed slot and a retaining tongue at diametrically opposed points, a locking key insertible into the slot and having a bendable tongue, a nut receiving locking washer having opposed tongue receiving recesses, said washer being shiftable radially relative to the nut therein, there being notches in the wall of the opening in the washer for receiving corners of the nut.

2. A nut lock including a base washer having a slot extending into the periphery thereof, said slot having an enlarged portion, a holding tongue extending from the washer at a point opposite the slot, a key insertible into the slot and adapted to fit snugly therein, a locking washer having opposed recesses, said washer having an elongated nut receiving opening and being shiftable longitudinally relative to a nut therein to engage the nut and position the tongue of the base washer in one of the recesses, the tongue of the key being bendable into the other recess to hold the locking washer in shifted position.

3. The combination with a base washer and a retaining tongue extending therefrom, there being a slot extending into the washer at a point diametrically opposite the tongue, said slot being of variable width, of a separate key detachably and snugly fitted within the slot for retention therein by the nut to be locked, a locking washer having an elongated nut receiving opening, there being notches in the wall of the opening, and diametrically opposed recesses in the periphery of the washer, said washer being shiftable relative to the base washer and nut to position the tongue in one of the recesses in the locking washer and to bring the other recess in position to receive the tongue of the key, said tongue being bendable into the recess and over the lock washer to hold the washer against relative movement.

In testimony that I claim the foregoing as my own I have hereto affixed my signature in the presence of two witnesses.

ANTHONY NAINKA.

Witnesses:
A. B. FARNSWORTH,
G. A. KAEMPFLER.